UNITED STATES PATENT OFFICE.

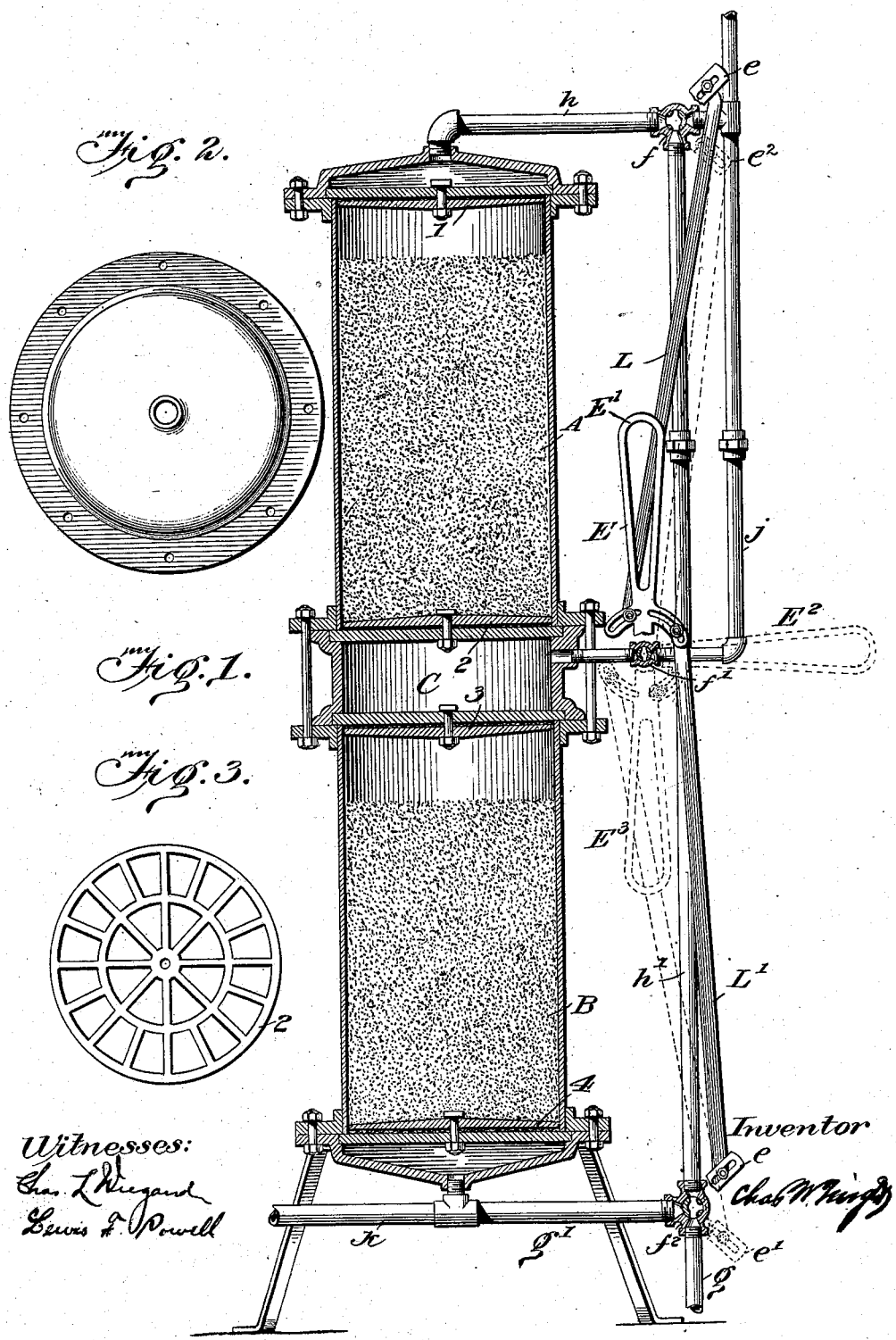

CHARLES W. WRIGHT, OF BALTIMORE, MARYLAND.

FILTER.

No. 899,645.

Specification of Letters Patent.   Patented Sept. 29, 1908.

Application filed November 7, 1907.  Serial No. 401,188.

*To all whom it may concern:*

Be it known that I, CHARLES W. WRIGHT, a citizen of the United States, residing in the city of Baltimore and State of Maryland, have invented a new and useful Filter for Filtering and Clarifying Water.

My invention relates to improvement in water filter, so that water may be filtered twice while passing through one column, and consists:

First,—of one hollow, sectional, column, closed at ends, containing grids and strainers so as to form two large and three small chambers. The two large chambers to contain any filtering material commonly used in filtering. A finer material always being used in the lower large chamber than the upper large chamber; the small upper and middle chambers being receivers for sediment and foreign matter taken from the water when in operation.

Second,—Connected to the column are pipes in which are two three-way and one two-way control cocks, connected to a lever and so timed and controlled by the lever that by certain positions of the lever the filter may be at work, lower chamber washed out and cleansed of sediment, or the upper chamber likewise cleansed, thereby having any of the three operations independent of the other two.

I attain these objects by the mechanism and combination illustrated in the accompanying drawing, in which Figure 1 is a vertical section of the entire apparatus, Fig. 2 a top view, Fig. 3 a top view of grids.

Similar letters and figures refer to similar parts throughout the several views.

The chambers A and B are cylindrical hollow vessels, containing filtering material, the material being supported by grids 2 and 4; these grids being made "web" form with gauze or perforated sheet metal for the support of the filtering material. Grids 1 and 3 retain the filtering material when washing out.

Water entering through supply pipe G, cock $f^2$, pipe $h^1$, cock $f$ pipe $h$ grid 1 into chamber A through filtering material, and grid 2 into washing chamber C through grid 3, filtering in chamber B through grid 4 and out through service pipe $k$ to house, thus removing all sediment and clarifying the water.

Cocks $f$ (three-way), $f^1$ (two-way), and $f^2$ (three-way), are all controlled by handle E and rods L and $L^1$. When handle is in position shown by $E^1$ the water is being filtered. When handle is in position shown by $E^2$ cock $f$ remains closed, cock $f^1$ is open and cock $f^2$ is turned to position shown by lever $e$ to $e^1$, allowing water to flow through supply pipe $g$ and $g^1$ under filtering material in chamber B, thereby washing all sediment from and cleansing chamber B and filtering material therein, through retaining gauze 3, and out through washout chamber C, cock $f^1$ and washout pipe $j$.

When handle E is moved to position $E^3$ cock $f^1$ is closed, cock $f^2$ remains in position shown by $e^1$ and cock $f$ is turned to position shown by lever $e^2$, allowing the water to continue on up from chambers B and C through chamber A and filtering materials therein, removing all sediment from and cleansing chamber A and filtering material therein, through grid 1 and out through pipe $h$ and cock $f$ to washout. When muddy or foreign matter no longer appears at washout, handle is moved back to its original position $E^1$ and apparatus is again filtering as at first.

What I claim as new is:

1. In a compound filter, the combination of primary and secondary filters in one column, a chamber between said filters, pipes leading to said filter and a supply pipe leading therefrom, a wash out pipe, a valve for the primary filter, a valve for the secondary filter and a valve for said chamber, and a single lever controlling all of said valves, whereby by the movement of said lever the water may pass through both filters to the supply pipe, or the water may be reversed and wash out the filters, substantially as described.

2. In a compound filter, the combination of primary and secondary filters in one column, a chamber between said filters, pipes leading to said filter and a supply pipe leading therefrom, a wash out pipe, a valve for the primary filter, a valve for the secondary filter and a valve for said chamber, and a single lever controlling all of said valves, whereby by the movement of said lever the water may pass through both filters to the supply pipe, and the water may be reversed passing through one filter to the intermediate chamber to the wash out or through both filters to the wash out, substantially as described.

3. In a compound filter, the combination of primary and secondary filters, a chamber between said filters, pipes leading to said filter, a three-way valve for each filter and a two-way valve for the intermediate chamber, and a single lever controlling said valves whereby the water may be filtered through both filters or the water may be reversed and wash out one filter or wash out both filters, substantially as described.

CHAS. W. WRIGHT.

Witnesses:
 LEWIS F. POWELL,
 CHAS. L. WIEGAND.